F. W. LUSCOMB.
MACHINE FOR INSERTING LACING HOOKS.
APPLICATION FILED NOV. 6, 1909. RENEWED NOV. 28, 1910.

1,035,981.

Patented Aug. 20, 1912.
6 SHEETS—SHEET 1.

Fig. 1.

Witnesses:
F. R. Rulstone
P. W. Pezzetti

Inventor:
Frederick W. Luscomb,
by Wright Brown Quimby & Mey
Attorneys.

F. W. LUSCOMB.
MACHINE FOR INSERTING LACING HOOKS.
APPLICATION FILED NOV. 6, 1909. RENEWED NOV. 28, 1910.

1,035,981.

Patented Aug. 20, 1912.
6 SHEETS—SHEET 2.

Fig. 2.

Witnesses.
F. R. Ponlstone
P. W. Pizzetti

Inventor:
Frederick W. Luscomb,
by Wright Brown Quinby & May
Attorneys.

F. W. LUSCOMB.
MACHINE FOR INSERTING LACING HOOKS.
APPLICATION FILED NOV. 6, 1909. RENEWED NOV. 28, 1910.

1,035,981.

Patented Aug. 20, 1912.

UNITED STATES PATENT OFFICE.

FREDERICK W. LUSCOMB, OF NEW BEDFORD, MASSACHUSETTS, ASSIGNOR TO ATLAS TACK COMPANY, OF FAIRHAVEN, MASSACHUSETTS, A CORPORATION OF NEW JERSEY.

MACHINE FOR INSERTING LACING-HOOKS.

1,035,981. Specification of Letters Patent. Patented Aug. 20, 1912.

Application filed November 6, 1909, Serial No. 526,519. Renewed November 28, 1910. Serial No. 594,604.

*To all whom it may concern:*

Be it known that I, FREDERICK W. LUS-COMB, of New Bedford, in the county of Bristol and State of Massachusetts, have invented certain new and useful Improvements in Machines for Inserting Lacing-Hooks, of which the following is a specification.

This invention relates to machines for inserting lacing hooks in shoe uppers, and is embodied in a machine including hook-setting members arranged and operated in a manner by which it is sought to improve the quality of work performed, and to avoid accidental crushing or displacing of the lacing hook while setting the same. To this end the machine is provided with a lacing hook carrier and a setting member.

The machine also includes a flaring member which acts upon the shank of a hook to slightly flare the shank prior to the operation of the setting member, and which is provided with a punch for punching and feeding the work.

In carrying out the invention, the hook carrier and the setting member are arranged to slide toward and from each other in fixed bearings, and the flaring member is arranged to slide in movable bearings and is actuated to first puncture and then feed the work. In operation the flaring member in feeding the work moves to a position in the line of the setting member, and remains in such position during a movement of the hook carrier which inserts the shank of the hook in the work and slightly flares the shank against the flaring member. The carrier then remains stationary while the flaring member recedes and moves laterally, and while the setting member moves toward the carrier to clench the shank.

By reason of employing the aforesaid mode of operations, the work is at all times positively under the control of one or the other of the three devices named, and no possibility occurs by which the work may be displaced after having once been engaged by the punch until after the completion of the setting operation.

The invention also includes means for varying the length of the feeding strokes in conformity with work of different sizes, and an adjustable gage for the work is provided and connected to the feed adjusting means whereby the gage may be automatically adjusted when the feeding means is adjusted. By reason of combining the gage with the feeding means in this manner, accuracy is insured in setting the hooks in one flap of the work in the same relative positions as those in the opposite flap.

Other features of novelty and advantage are hereinafter described, and are illustrated upon the accompanying drawings.

On the drawings which illustrate one form in which the invention may be embodied.

The same reference characters indicate the same parts wherever they occur.

A frame in which the various devices and actuating mechanism are mounted is indicated at 30, and is formed with bearings 31 for a prime power shaft 32. The frame is formed with an overhanging front portion provided with fixed bearings 33 for a plunger 34. A setting member 35 is affixed at the lower end of the plunger 34. The lower part of the frame is formed with a cylindrical housing 36, and with fixed bearings 37 for a sliding plunger 38. The bearings 37 are in line with the upper bearings 33, and the plunger 34 and plunger 38 are movable toward and from each other. The upper end of the plunger 38 is provided with a pivoted carrier 40 mounted upon a pivot stud 39. The carrier 40 receives the lacing hooks $x$ one at a time, and transfers them from a lower plane to the work $a$ which is supported upon a feed table 41.

Figures 9, 10, 11:
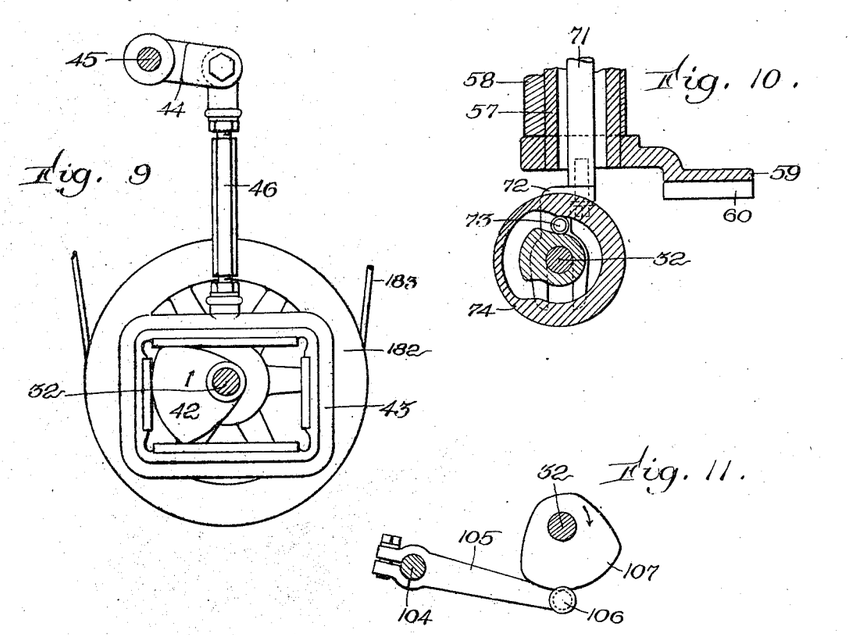
Fig. 9 represents cam mechanism for actuating the setting member.
Fig. 10 represents a vertical section of fragments of the mechanism for punching and feeding the work.
Fig. 11 represents an elevation of cam mechanism for retracting the hook carrier.

The means for reciprocating the plunger 34 is shown by Fig. 9 and includes a cam 42 on the shaft 32, a yoke 43 coöperating with the cam, an arm 44 affixed upon a rockshaft 45, and a connecting rod including a turn-buckle 46 connecting the yoke and the arm 44. The rock-shaft 45 is mounted in bearings in the frame 30, and has affixed at its forward end a forked arm 47 which embraces a sliding block 48 pivotally connected to the plunger 34. The shape of the cam 42 is such as to provide a dwell of the plunger at each extreme of its movement.

Figure 1:
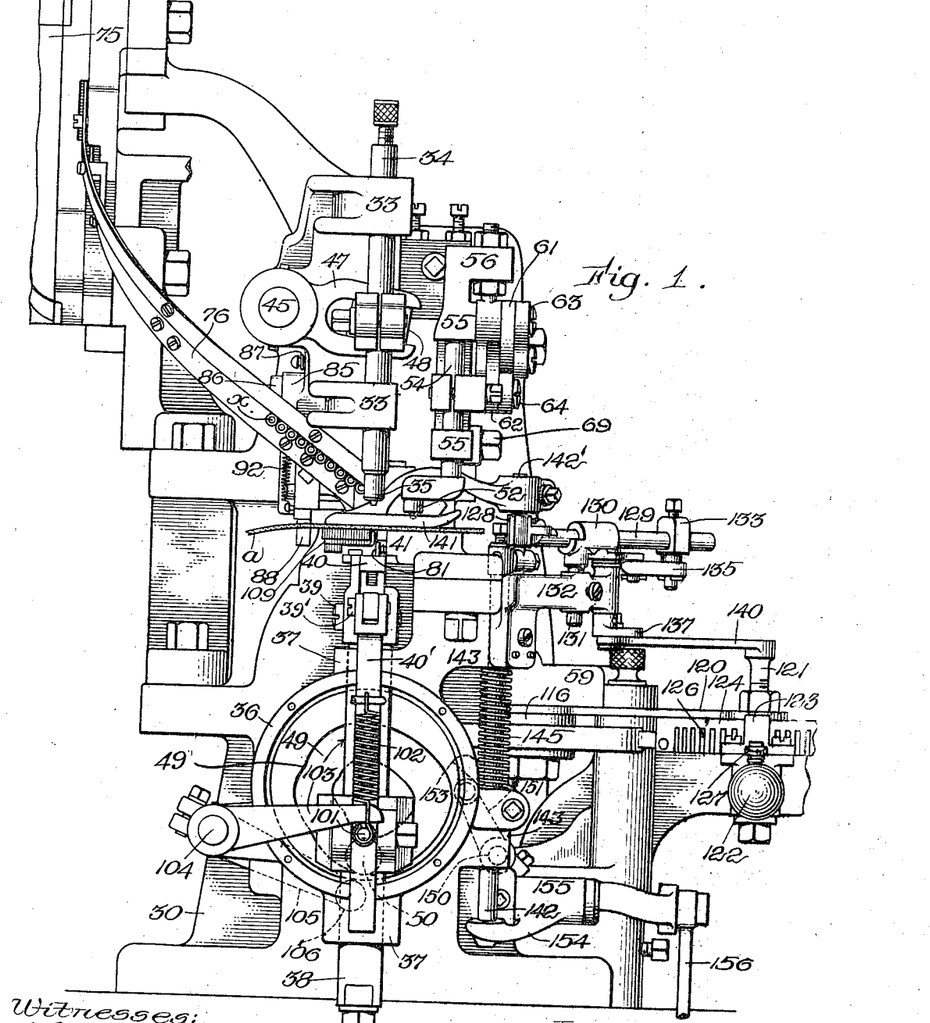
—Figure 1 represents a front elevation of a machine for inserting and setting lacing hooks.
Figure 2:
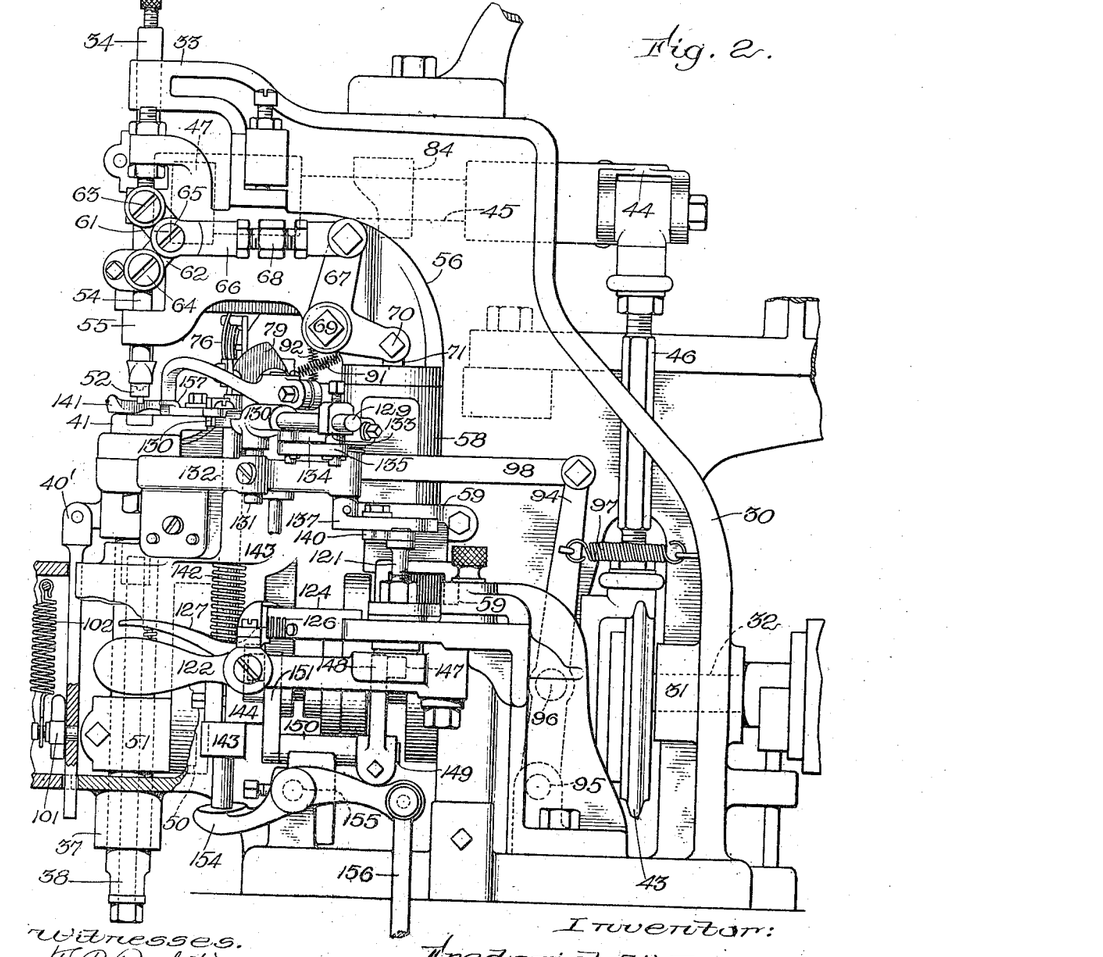
Fig. 2 represents a right side elevation thereof.

Means for actuating the plunger 38 is shown by Figs. 1 and 2, and includes a cam 49 affixed upon the shaft 32, and arranged within the housing 36. The cam coöperates with a roll 50 attached to a block 51 on the plunger, and the action of the cam is such as to impart an irregular motion to the plunger, as hereinafter explained.

The flaring member is indicated at 52, and is formed with a central projection 53 which is employed to punch and feed the work. The member 52 is affixed at the lower end of a plunger 54 which is mounted to slide in bearings 55 on a feed carriage 56. The feed carriage is formed with a hollow sleeve 57 shown by Figs. 10 and 24, and the sleeve is arranged in a bearing 58 formed on the frame 30. The lower end of the sleeve is provided with an arm 59 which is formed with a groove 60, and which is engaged by means hereinafter described for oscillating it to impart feeding motion to the carriage. The motion of the carriage is such as to move the member 52 to and from the line of the setting member 35 and the feeding stroke may be increased or decreased by adjusting the actuating means as hereinafter described.

The plunger 54 which carries the flaring member and punch is reciprocated in its bearings 55 toward and from the feed table by toggle links 61 and 62 (see Fig. 2). The link 61 is pivoted at 63 to a portion of the feed carriage, and the link 62 is pivoted at 64 to a block or collar affixed to the plunger 54. The two links are joined by a pivot stud 65 which passes through one end of a link or connecting rod 66 the other end of which is pivotally connected to a bell crank 67. The connecting link 66 is here shown as including a turn-buckle 68 by which it may be adjusted. The bell crank 67 is pivoted at 69 to the feed carriage 56, and it has an arm which is pivoted at 70 to the upper end of a plunger 71 which extends through the hollow sleeve 57. The lower end of the plunger 71 carries a swiveled yoke 72 which embraces the shaft 32 and which is provided with a cam roll 73 coöperating with a cam 74 on the shaft. The movement imparted by the cam is such as to move the pivot stud 65 which connects the toggle links from the position shown by Fig. 8 to a position on the other side of a line intersecting the pivots 63 and 64. As a result of moving the stud 65 in this manner the punch is inserted in the work and its pressure upon the feed table is slightly relieved when the stud 65 moves beyond the line of the pivots 63 and 64. The purpose of so moving the punch to first punch the work and then relieve the pressure upon the feed table is to permit a relatively free feeding movement of the carriage 56 without exerting undue friction upon the feed table.

The lacing hooks are fed from a reservoir 75 to the upper end of a race 76 upon which they slide to a position at the rear of the setting member 35. The lower end of the race 76 is above and at the rear of the point where the hooks are placed upon the carrier 40 and they are transferred from the race 76 to the carrier by a supplemental race 76' (see Fig. 4). The foremost hook at the lower end of the race 76 is engaged by a releasing member 77 which is actuated and formed to release the hooks one at a time, and to retain all but the foremost hook.

Figures 3, 4, 5, 6, 7, 8:
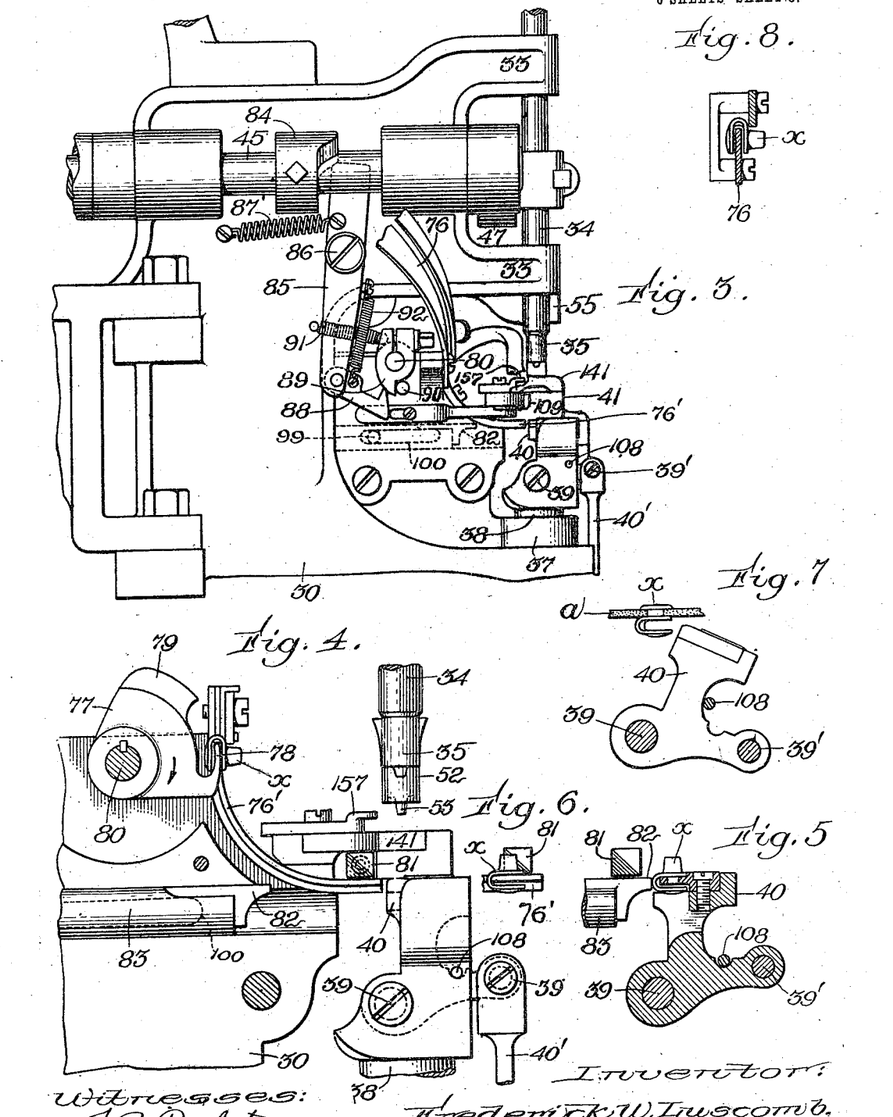
Fig. 3 represents a left side elevation of the front portion of the setting mechanism.
Fig. 4 represents a vertical section and elevation on a larger scale of a portion of the setting mechanism.
Fig. 5 represents a vertical section of the hook carrier and adjacent parts.
Fig. 6 represents an elevation of guiding devices for conducting the hook toward the carrier.
Fig. 7 represents an elevation of the carrier retracted from a clenched hook.
Fig. 8 represents a cross section of the hook race.
Figure 23:
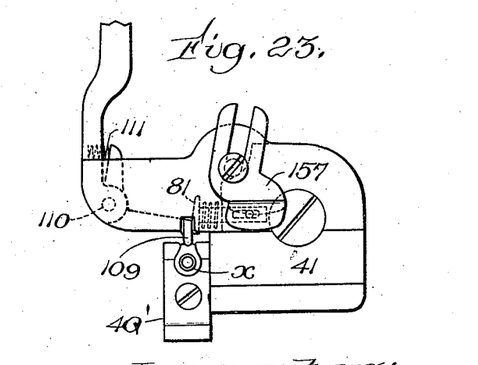
Fig. 23 represents a top plan view of the feed table including a work guide and spring detents for a hook.

The member 77 is formed with a finger 78, and with a blade 79, and is affixed upon a rock stud 80 which is oscillated to effect single feeding of the hooks. The finger 78 moves to and from a position in alinement with the lower end of the race and is adapted to receive the hook portion of a lacing hook, as shown by Fig. 4. When the releasing member is oscillated in the direction of the arrow in Fig. 4, the finger 78 is retracted from the lacing hook, thus permitting the hook to slide upon the supplemental race 76′ and the blade 79 is simultaneously moved transversely across the end of the race 76, and thereby closes the mouth of the race. The race 76′ terminates in a horizontal portion above which is a spring actuated detent 81 mounted in a socket in the feed table, as shown by Figs. 4 and 23. The detent is movable transversely of the race 76′ and normally stands in a position where it is adapted to engage and stop a hook, as shown by Fig. 6. From this position, the hook is positively advanced by a nose 82 on the forward end of a plunger 83 which is reciprocated toward and from the carrier 40.

The mechanism for actuating the hook-releasing member 77 is illustrated by Fig. 3, and includes a cam 84 affixed upon the rock-shaft 45, and a cam lever 85 pivoted at 86. One end of the lever is held against the cam by a spring 87, and the other end of the lever is provided with a pivoted hook finger 88 which is adapted to engage a complemental hook finger 89 affixed upon the rock stud 80 which carries the member 77. The finger 89 is normally held against a stop 90 by a spring 91 and the pivoted hook 88 is normally held against the finger 89 by a spring 92. The hook 88 is so actuated as to overreach the finger 89 and then to retract the latter to effect the release of a lacing hook. The hook 88 is then disengaged from the finger 89 and the latter is restored to the position shown by Fig. 4 by reason of its spring 91.

Figures 12, 13, 14, 15:
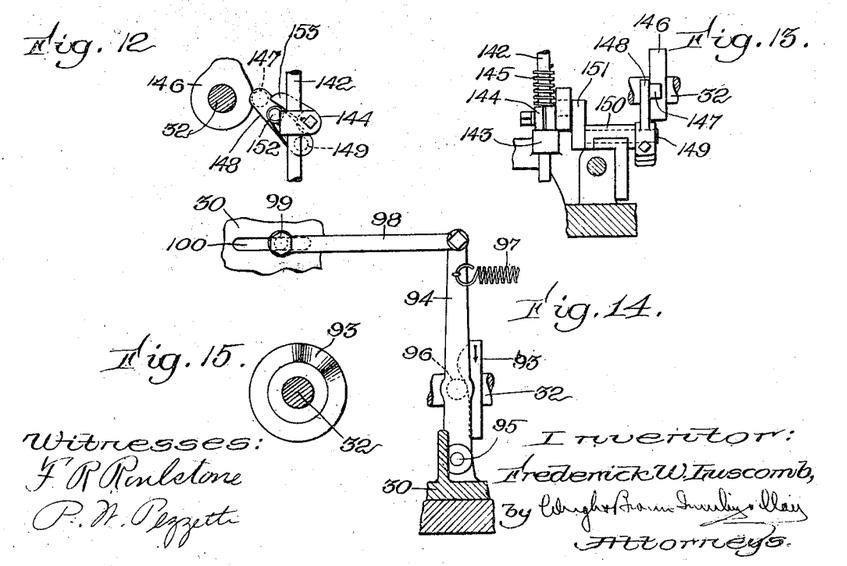
Fig. 12 represents an elevation of cam mechanism for raising the presser-foot.
Fig. 13 represents a transverse elevation of the mechanism included in Fig. 12.
Fig. 14 represents an elevation of cam mechanism for operating a slide which moves the hooks to the hook carrier.
Fig. 15 represents an end elevation of the cam included in Fig. 14.
Figure 16:
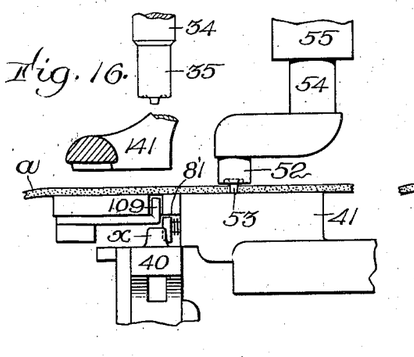
Fig. 16 represents a front elevation of fragments of the feeding and setting devices showing the punch at the end of its punching stroke.
Figure 17:
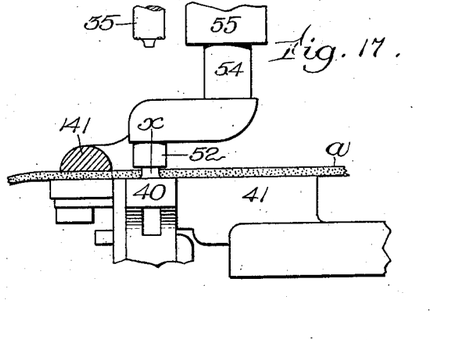
Fig. 17 represents the same parts in a subsequent position in which the flaring member is in the act of flaring the shank of a hook.
Figure 18:
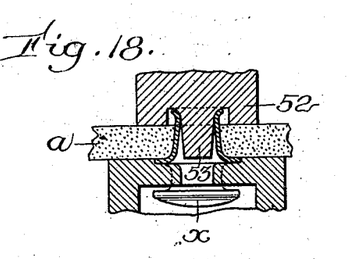
Fig. 18 represents a vertical section on a larger scale of the hook carrier and the flaring member in the act of flaring the shank.
Figures 19, 20, 21:
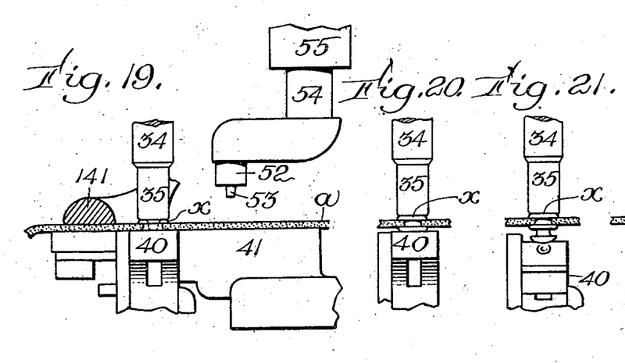
Fig. 19 represents a subsequent position of the same members in which the setting member is in the act of clenching the shank.
Fig. 20 represents an elevation of the hook carrier and setting member with the work broken away.
Fig. 21 represents an elevation of the same parts as those of Fig. 20, the carrier being retracted.
Figure 22:
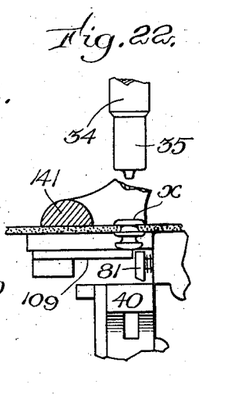
Fig. 22 represents the depressed hook carrier and setting member after having completed a setting operation.

The mechanism for reciprocating the feed plunger 83 is shown by Figs. 14 and 15, and includes a cam 93 affixed upon the shaft 32. A cam lever 94 pivoted at 95 is provided with a cam roll 96 which is held against the cam by a spring 97. The free end of the lever 94 is attached to a link 98 whose forward end is pivoted upon a stud 99 extending through a slot 100 in the frame 30. The stud 99 is affixed in the plunger 83 and operative connection is thereby completed between the cam lever and the plunger. When the plunger is projected forwardly for the purpose of feeding a hook, the nose 82 engages the hook, as shown by Fig. 5, and moves the open portion of the hook over a receiving part of the carrier 40. The hook in moving from the position shown by Fig. 6 to the position shown by Fig. 5 slightly displaces the spring detent 81 which immediately springs back into the path of a succeeding hook.

The hook carrier 40 is pivotally connected to a second plunger 40′ through the medium of a pivot stud 39′. The plunger 40′ is positively actuated, as hereinafter described, for the purpose of retracting the carrier to the position shown by Fig. 7 at the completion of a setting operation. The plunger extends downwardly through bearings in the housing 36 and is provided with a stud 101 which is connected to a spring 102, normally raising the stud against the free end of a swinging arm 103. The arm is affixed at one end of a rock-shaft 104 which is mounted in bearings in the frame 30, and which is provided with a cam arm 105 at the free end of which is a cam roll 106 coöperating with a cam 107 on the shaft 32 (see Figs. 1 and 11). It will be observed that the spring 102 tends to continuously raise the plunger 40′, and that the position of the stud 101 is determined by the arm 103 which is actuated by the cam 107. The cam 107 and the cam 49 which actuates the plunger 38 are so related as to permit the two plungers to rise in unison to insert the hook in the work. While the plunger 40′ is held elevated the plunger 38 is depressed ever so slightly by the portion 49′ of the cam 49. This movement separates the carrier and setting member sufficiently to relieve all pressure upon the hook. After this slight separation, the plunger 38 remains stationary for a brief period, during which the plunger 40′ is depressed to rock the carrier to the position shown by Fig. 7. This enables the carrier to descend, and the cam 49 acts again to further depress the plunger 38. As a result of the second downward movement of the plunger 38 the carrier 40 is again rocked to its upright position in a lower plane, as shown by Fig. 5, in which position it is adapted to receive another hook *x*. A stop pin 108 is arranged in the head of the plunger 38 to limit the rocking of the carrier 40, as shown by Figs. 4 and 5.

Figure 24:
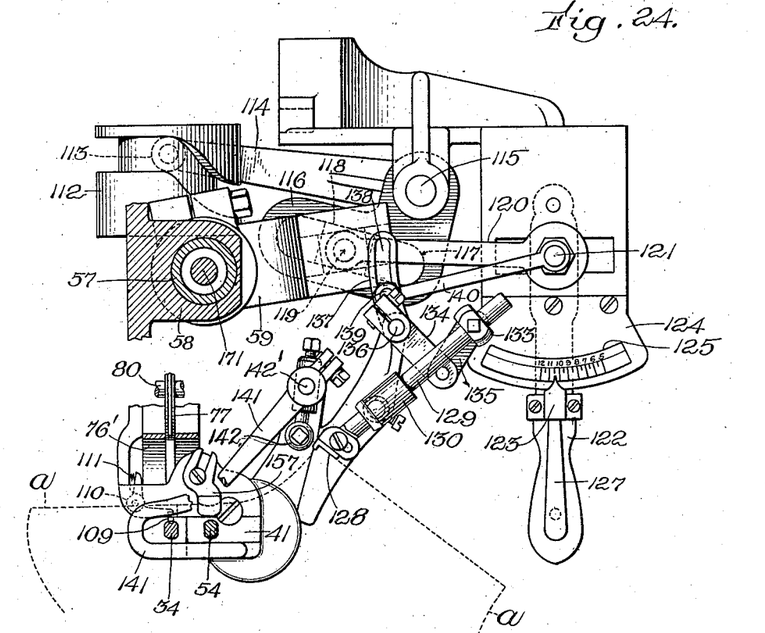
Fig. 24 represents a top plan view and partial section of the work-feeding means, the adjusting means therefor and an automatic gage for positioning the work with relation to the hook-inserting mechanism.
Figure 25:
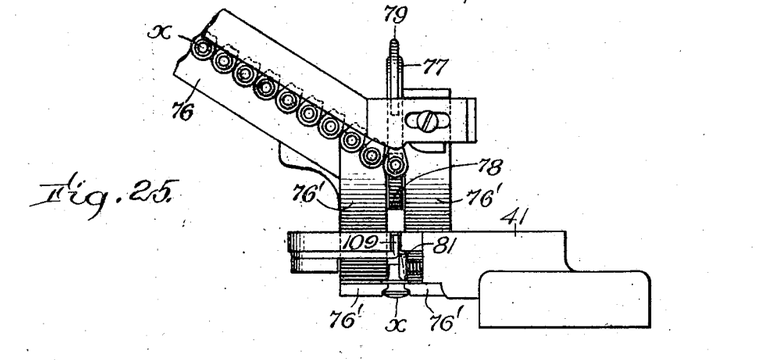
Fig. 25 represents a front elevation of the lower end of the hook-race and the surrounding parts.

When the carrier is raised to transfer a hook, the hook engages the yielding member 109, shown by Figs. 23, 24, and 25. The member 109 is pivoted at 110 and is normally held in position to engage the hook by a spring 111, and is provided for the purpose of preventing the hook from leaving the carrier while the carrier is in motion.

The feed carriage 56 is oscillated by a cam 112 shown in Fig. 24. The cam is affixed upon the shaft 32 and coöperates with a cam roll 113 at the free end of an arm 114 pivoted upon a stud 115. The arm 114 is formed with a second arm 116, which is provided with a slot 117 in which is arranged a sliding block 118. A stud 119 extends through the block 118, through a link 120 and through a similar block which occupies the groove 60 in the arm 59 attached to the hollow sleeve of the feed carriage. When the cam arm 114 is oscillated, movement is imparted to the arm 59 and the feed carriage is thus oscillated to move the punch to and from the line of the setting member. The link 120 is connected to a stud 121 carried by a hand lever 122, by which the stud 119 may be shifted relatively to the arms 116 and 59 for the purpose of increasing or decreasing the length of the feeding stroke of the carriage. The hand lever 122 may be provided with a pointer 123 and the machine may be provided with a gage plate 124 having an index 125 adapted to coöperate with the pointer 123 for the purpose of determining the desired adjustment of the feed regulating mechanism. The gage plate 124 may be provided with notches 126, as shown by Fig. 2, and the hand lever may be provided with a spring actuated latch 127 adapted to enter the notches 126 and lock the lever in the position to which it is moved.

Figs. 1 and 24 include a work gage 128 which is adapted to be engaged by the work for determining the initial position of the work with relation to the feeding and hook-setting devices. In practice, the right hand side of a shoe quarter is provided with hooks before the hooks are inserted in the left hand side of the quarter. The quarter is placed upon the feed table in the position indicated by dotted lines in Fig. 24, with the top edge lying in the angle of the gage 128. The gage thus determines the position of the lowermost hook, that is, the hook which is farthest from the top edge of the quarter. After the full number of hooks has been set in this side of the quarter, the quarter is inverted and the left hand side is placed upon the feed table in the reverse position, that is, in such position as to insert the first hook at the top so that the quarter will be fed from the top toward the bottom. The operator in determining the position of the first hook in the left hand side of the quarter may be guided by observing the relative position of the top hook of the right hand side of the quarter, and the work-feeding mechanism will thereafter determine the correct positions of the succeeding hooks.

The gage 128 is adjustable, and is connected to the feed regulating mechanism by means which automatically adjust the gage in accordance with the spacing of the hooks, and therefore in accordance with the position of the pointer 123 coöperating with the index 125. The gage is here shown as affixed at one end of a rod 129 which is mounted to slide in a bearing 130. The bearing is afforded by the head of a stud 131 pivoted in a bracket 132. A collar 133 affixed to the rod 129 is pivotally connected with an arm 134 by means of a link 135. The arm 134 is tightly clamped on a rock stud 136 which is provided with a second arm 137. The arm 137 is formed with a slot 138 which is occupied by an adjustable clamping stud 139. The stud 139 extends through one end of a link 140 of which the other end is pivoted upon the stud 121. By this means, the gage 128 is moved by the hand lever 122 in accordance with the feed regulating mechanism.

The work is held upon the feed table by a presser-foot 141 which is clamped on a stud 142' carried by a vertically movable rod 142. The rod 142 is mounted in bearings 143 in the frame 30, and is provided with a collar 144, and with a helical spring 145 compressed between the collar and one of the bearings 143. The force of the spring tends to hold the presser-foot downwardly upon the feed table and the presser-foot is periodically elevated by a cam 146 on the shaft 32 (see Figs. 12 and 13). The cam coöperates with a cam roll 147 at the free end of an arm 148. The arm is affixed upon one end of a rock-shaft 149 mounted in a bearing 150. The other end of the rock-shaft carries an arm 151 at the free end of which is a roll 152 which is adapted to engage an inclined face of a finger 153 formed upon the collar 144. These elements transmit movement from the cam 146 to the presser-foot for lifting the presser-foot.

The presser-foot may be manually raised when it is desired to insert or remove the work. For this purpose a lifting member 154 is provided, as shown by Figs. 1 and 2. The lifter 154 is in the form of a lever and is pivoted at 155, and is connected to a rod 156 which may be provided with a treadle, not shown.

For the purpose of guiding the work as it is fed along the feed table, the table is provided with a fixed guide 157, as shown by Figs. 3 and 4.

Having thus explained the nature of my invention, and described a way of constructing and using the same, although without attempting to set forth all of the forms in which it may be made or all of the modes of its use, what I claim is:

1. In a machine for inserting lacing hooks, a setting member, fixed bearings therefor, a work punch formed with means for flaring the shank of a hook, means for moving the punch to punch and feed the work, means for inserting the shank in the work in the line of said setting member, said inserting means coöperating with the punch to partially flare the shank, and means for causing the setting member to completely clench the shank.

2. In a machine for inserting lacing hooks, means for inserting the shank of a hook in the work, means for coöperating with the inserting means to partially flare the shank, said means receding after thus partially flaring the shank, and other means coöperating with said inserting means for further flaring the shank.

3. In a machine for inserting lacing hooks, a lacing hook carrier and a setting member movable toward and from each other, means for moving the carrier toward the setting member, and means for moving the setting member toward the carrier, said carrier-moving means being timed to complete the movement of the carrier toward the setting member before the setting member is moved to clenching position, and to hold the carrier at the limit of said movement while said setting member is moved to clenching position.

4. In a machine for inserting lacing hooks, a lacing hook carrier movable toward the work for inserting a hook, means coöperating with the carrier for partially flaring the shank of the lacing hook, said means receding after thus partially flaring the shank, and a separate member for further flaring the shank.

5. In a machine for inserting lacing hooks, a setting member, a flaring member movable to and from the line of the setting member, a lacing hook carrier for forcing the shank of a hook against the flaring member to partially flare the shank, and means for moving the setting member to clench the shank.

6. In a machine for inserting lacing hooks, a setting member, a feed table for the work, a flaring member movable toward and from the table and toward and from the line of the setting member, a punch on said flaring member for punching and feeding the work, a lacing hook carrier movable toward the flaring member for partially flaring the shank of the hook, and means for moving the setting member to clench the shank.

7. In a machine for inserting lacing hooks, a lacing hook carrier, a pair of plungers pivotally connected to said carrier at different points, and means for reciprocating said plungers to move the carrier bodily in one direction, and to rock the carrier on its pivots in moving the carrier in the opposite direction.

8. In a machine for inserting lacing hooks, a lacing hook carrier, a pair of plungers pivotally connected to said carrier at different points, and means for moving the plungers in unison in one direction, and for moving them alternately in the opposite direction.

9. In a machine for inserting lacing hooks, means for feeding the work step by step, means for regulating the feeding means for varying the length of the steps, a stationary adjustable work gage, and means connected to said regulating means for positioning the work gage.

10. In a machine for inserting lacing hooks, means for feeding the work step by step, a manually movable member, means connecting said feeding means and said member for regulating the feeding means to vary the length of the steps, an index, indicating means carried by said manual member and coöperating with said index, a stationary adjustable work gage, and means connected to said manual member for positioning said gage.

In testimony whereof I have affixed my signature, in presence of two witnesses.

FREDERICK W. LUSCOMB.

Witnesses:
W. P. ABELL,
P. W. PEZZETTI.

Copies of this patent may be obtained for five cents each, by addressing the "Commissioner of Patents, Washington, D. C."